US011036416B2

United States Patent
Bode et al.

(10) Patent No.: US 11,036,416 B2
(45) Date of Patent: Jun. 15, 2021

(54) DEDUPLICATED STORAGE WITH MULTIPLE STORAGE DOMAINS

(71) Applicant: International Business Machines Corporation, Armonk, NY (US)

(72) Inventors: Christopher C. Bode, Cary, NC (US); Daniela Kern Mainieri Trevisan, Porto Alegre (BR); Bernhard J. Klingenberg, Grover Beach, CA (US)

(73) Assignee: International Business Machines Corporation, Armonk, NY (US)

( * ) Notice: Subject to any disclaimer, the term of this patent is extended or adjusted under 35 U.S.C. 154(b) by 18 days.

(21) Appl. No.: 16/183,334

(22) Filed: Nov. 7, 2018

(65) Prior Publication Data

US 2020/0142622 A1    May 7, 2020

(51) Int. Cl.
     *G06F 3/06*      (2006.01)
     *G06F 11/14*      (2006.01)

(52) U.S. Cl.
     CPC ............ *G06F 3/0641* (2013.01); *G06F 3/067* (2013.01); *G06F 3/0608* (2013.01); *G06F 11/1469* (2013.01); *G06F 2201/805* (2013.01); *G06F 2201/82* (2013.01)

(58) Field of Classification Search
None
See application file for complete search history.

(56) References Cited

U.S. PATENT DOCUMENTS

| | | | |
|---|---|---|---|
| 8,977,812 B1 * | 3/2015 | Chen | G06F 3/0641 |
| | | | 711/112 |
| 9,495,435 B2 | 11/2016 | Zhang et al. | |
| 9,501,545 B2 | 11/2016 | Woodward et al. | |
| 10,007,445 B2 | 6/2018 | Nithrakashyap et al. | |
| 2009/0171888 A1 | 7/2009 | Anglin | |
| 2010/0082558 A1 | 4/2010 | Anglin et al. | |
| 2017/0103068 A1 * | 4/2017 | Araki | G06F 17/3015 |
| 2017/0255643 A1 * | 9/2017 | Maheshwari | G06F 16/182 |
| 2018/0059973 A1 | 3/2018 | Jain et al. | |
| 2019/0340262 A1 * | 11/2019 | O'Hare | G06F 16/9014 |

OTHER PUBLICATIONS

Xia et al., A comprehensive study of the past present and future of data deduplication, Proceedings of IEEE, vol. 104, No. 9, pp. 1681-1710 (Year: 2016).*
Zhu et al., Avoiding the disk bottleneck in the data domain deduplication file system, FAST 6th USENIX conference on file storage and technologies, vol. 8, pp. 269 to 282. (Year: 2008).*
El-Shimi et al., "Primary Data Deduplication—Large Scale Study and System Design," Proceedings of the 2012 USENIX Conference on Annual Technical Conference, Jun. 2012, 12 pages. https://www.usenix.org/system/files/conference/atc12/atc12-final293.pdf.

(Continued)

*Primary Examiner* — Shelly A Chase
(74) *Attorney, Agent, or Firm* — Yee & Associates, P.C.

(57) ABSTRACT

A method, apparatus, system, and computer program product for deduplicating data. Data is stored by a computer system in storage domains in a storage system. Deduplication is performed by the computer system within each storage domain in the storage domains using a hash table that includes entries for all of the storage domains. Cross-deduplication between the storage domains is avoided in the storage system.

20 Claims, 13 Drawing Sheets

(56) References Cited

OTHER PUBLICATIONS

Ghosh et al., "Scalable Data Deduplication using Similarity Matching and in-memory indexes," an IP.com Prior Art Database Technical Disclosure, IPCOM000226554D, Published Apr. 16, 2013, 5 pages.

Cinetto et al., "Backup and Restore System for Zimbra Collaboration Server," an IP.com Prior Art Database Technical Disclosure, IPCOM000230691D, Published Sep. 3, 2013, 7 pages.

Anonymous, "A system and method for global deduplication with multiple storage appliance," an IP.com Prior Art Database Technical Disclosure, IPCOM000236964D, Published May 23, 2014, 19 pages.

Xu, "Online Deduplication for Distributed Databases, "Thesis, Pittsburgh, PA, Sep. 2016, 103 pages.

* cited by examiner

```
Section defining the various different lists for tracking the environmental constructs // PROD_HOSTS List of all hosts that are in the production domain
PROD_HOSTS = HOST_N,HOST_N+1,...

// BKP_HOSTS List of all hosts that are in the backup domain
BKP_HOSTS = HOST_N,HOST_N+1,...

// PROD_LUNS List of all LUNs that are allocated to production domain hosts
PROD_LUNS = LUN_N,LUN_N+1,...

// BKP_LUNS List of all LUNs that are allocated to backup domain hosts
BKP_LUNS = LUN_N,LUN_N+1,...
```
⎬ 902

```
#define lookup functions for searching the constructs
// Function that searches for HOST_N on PROD_HOSTS list. Returns true if it finds and false If it does not find the host in the list.
LOOKUP_PROD_HOSTS(HOST_N)

// Function that searches for HOST_N on BKP_HOSTS list. Returns true if it finds and false If it does not find the host in the list.
LOOKUP_BKP_HOSTS(HOST_N)

// Function that searches for LUN_N on PROD_LUNS list. Returns true if it finds and false If it does not find the host in the list.
LOOKUP_PROD_LUNS(LUN_N)

// Function that searches for LUN_N on BKP_LUNS list. Returns true if it finds and false If it does not find the host in the list.
LOOKUP_BKP_LUNS(LUN_N)

// SEG_ID_N is the segment identifier

PROD_DOM_METADATA= Table of segments for production domain

BKP_DOM_METADATA= Table of segments for backup domain
```
⎬ 904

```
// Function that searches for DATA_N on production domain data pool. Returns true if it finds and false if it does not.
LOOKUP_PROD_DATA_POOL(DATA_N)

// Function that searches for DATA_N on backup domain data pool. Returns true if it finds and false if it does not.
LOOKUP_PROD_DATA_POOL(DATA_N)
```
⎫
⎬ 904
⎭

```
#Define functions that perform operations on the data and tracking constructs
// Function that checks data integrity for SEG_ID_N data
CHECK_SUM_PROD(SEG_ID_N,MD_COUNT,DATA_N)

// Function that checks data integrity for SEG_ID_N data
CHECK_SUM_BKP(SEG_ID_N,MD_COUNT,DATA_N)

// Function that stores data for the specified segment ID on the production domain data pool and increments MD_COUNT
STORE_DATA_PROD_DOMAIN(SEG_ID_N,MD_COUNT,DATA_N)

// Function that stores data for the specified segment ID on the backup domain data pool and increments MD_COUNT
STORE_DATA_BKP_DOMAIN(SEG_ID_N,MD_COUNT,DATA_N)

// Function that generates an alert for data corruption
GENERATE_DATA_CORRUPTION_ALERT(HOST_N,LUN_N,SEG_ID)

//Function that updates/creates pointers for data that is not unique
UPDATE_MD_POINTERS_PROD(HOST_N,LUN_N,SEG_ID_N,POINTER_N)

// Function that updates/creates pointers for data that is not unique
UPDATE_MD_POINTERS_BKP(HOST_N,LUN_N,SEG_ID_N,POINTER_N)

// Function that recovers DATA_N from the backup domain pool to the production domain pool under SEG_ID_N
RECOVER_DATA_FROM_BKP_DOM(DATA_N,SEG_ID_N)
```
⎫
⎬ 906
⎭

```
// Function that recovers DATA_N from the production domain pool to the backup domain pool under SEG_ID_N
RECOVER_DATA_FROM_PROD_DOM(DATA_N,SEG_ID_N)                                                                }— 906

IS_PROD_DATA_UNIQUE = "null"
IS_BKP_DATA_UNIQUE = "null"

#detailed example code of the processing of an incoming write request

// Request for write from HOST_N, LUN_N, SEG_ID_N,DATA_N
WRITE_REQUEST(HOST_N,LUN_N,DATA_N)
{
    # check the origin host of the write and the destination volume/lun to make sure this write goes to the correct domain // Search for HOST_N on PROD_HOSTS list
    $IS_PROD_HOST = LOOKUP_PROD_HOSTS(HOST_N)
    // Search for LUN_N on PROD_LUNS list
    $IS_PROD_LUN = LOOKUP_PROD_LUN(LUN_N)
    // Search for HOST_N on BKP_HOSTS list
    $IS_BKP_HOST = LOOKUP_BKP_HOSTS(HOST_N)
    // Search for LUN_N on BKP_LUNS list
    $IS_BKP_LUN = LOOKUP_BKP_LUN(LUN_N)

IF [$IS_PROD_HOST == "true"] or [IF $IS_PROD_LUN == "true"]; then
        // Match for HOST and/or LUN in the production domain
        //Search for DATA_N on production domain data pool
        $IS_PROD_DATA_NOT_UNIQUE = LOOKUP_PROD_DATA_POOL(DATA_N)
        IF $IS_PROD_DATA_NOT_UNIQUE == "true"; then
            // As data is not unique for that HOST and/or LUN only pointers/metadata are updated/created
            UPDATE_MD_POINTERS_PROD(HOST_N,LUN_N,SEG_ID_N,POINTER_N)
        ELSE
            #perform integrity checking and repair as needed
            // Checks SEG_ID_N data integrity
            $DATA_INTEGRITY_PROD = CHECK_SUM_PROD(SEG_ID_N,MD_COUNT,DATA_N)
            IF $DATA_INTEGRITY_PROD == "true"; then
```

908 ⎫ (bracket spanning from line above 910 down through 912)
910
912

```
            // Store data for SEG_ID_N and increments MD_COUNT
            STORE_DATA_PROD_DOMAIN(SEG_ID_N, MD_COUNT,DATA_N)
    ELSE
        // Check if DATA_N is present in the backup domain pool
        $IS_DATA_PRESENT_BKP_DOM = LOOKUP_BKP_DATA_POOL(DATA_N)
        IF $IS_DATA_PRESENT_BKP_DOM == "true"; then
            // Recover data from backup domain pool
            RECOVER_DATA_FROM_BKP_DOM(DATA_N,SEG_ID_N)
        ELSE
            GENERATE_DATA_CORRUPTION_ALERT(HOST_N,LUN_N,SEG_ID_N)
        FI
    FI
FI
```
} 908

```
#store writes to the backup domain separately from production avoiding cross domain deduplication and make the associated
metadata updates
IF [$IS_BKP_HOST == "true"] or [IF $IS_BKP_LUN == "true"]; then
    // Match for HOST and/or LUN in the backup domain
    //Search for DATA_N on backup domain data pool
    $IS_BKP_DATA_NOT_UNIQUE = LOOKUP_BKP_DATA_POOL(DATA_N)
    IF $IS_BKP_DATA_NOT_UNIQUE == "true"; then
        // As data is not unique for that HOST and/or LUN only pointers/metadata are updated/created
        UPDATE_MD_POINTERS_BKP(HOST_N,LUN_N,SEG_ID_N,POINTER_N)
    ELSE
        // Checks SEG_ID_N data integrity
        $DATA_INTEGRITY_BKP = CHECK_SUM_BKP(SEG_ID_N,MD_COUNT,DATA_N)
        IF $DATA_INTEGRITY_BKP == "true"; then
            // Store data for SEG_ID_N and increments MD_COUNT
            STORE_DATA_BKP_DOMAIN(SEG_ID_N, MD_COUNT,DATA_N)
        ELSE
```
} 912

```
            // Check if DATA_N is present in the production domain pool
            $IS_DATA_PRESENT_PROD_DOM = LOOKUP_PROD_DATA_POOL(DATA_N)
```
} 914

FIG. 12

```
IF $IS_DATA_PRESENT_PROD_DOM == "true"; then
    // Recover data from production domain pool
    RECOVER_DATA_FROM_PROD_DOM(DATA_N,SEG_ID_N)
ELSE
    GENERATE_DATA_CORRUPTION_ALERT(HOST_N,LUN_N,SEG_ID_N)    } 914
FI
```

DEDUPLICATED STORAGE WITH MULTIPLE STORAGE DOMAINS

BACKGROUND

1. Field

The disclosure relates generally to an improved computer system and more specifically to a method, apparatus, system, and computer program product for deduplicating data in a storage system with multiple storage domains.

2. Description of the Related Art

Reducing the size of data in storage systems is desirable with the large amounts of data that are present in computer systems. Data deduplication is a data compression technique used to reduce storage overhead. Data deduplication eliminates duplicate data to obtain a smaller footprint of data in a storage system. The storage system can be a disk drive, a backup server, a group of backup servers, a storage area network (SAN), or some other type of storage system.

With deduplication, the process eliminates redundant copies of data to reduce the amount of storage space used. The deduplication process removes copies of data such that one copy of the data is retained in the storage system. Redundant data is replaced with a pointer to the remaining copy of the data.

For example, in an email system, multiple copies of the same attachment may be present. A hundred copies of an attachment, such as a presentation file that is 2 megabytes in size, can be stored in the email system. When a backup is performed, archiving all of these copies of the presentation file uses 200 megabytes of storage for this attachment. With deduplication, the amount of storage space needed drops to 2 megabytes for this particular attachment.

SUMMARY

According to one embodiment of the present invention, a method deduplicates data. Data is stored by a computer system in storage domains in a storage system. Deduplication is performed by the computer system within each storage domain in the storage domains using a hash table that includes entries for all of the storage domains. Cross-deduplication between the storage domains is avoided in the storage system.

According to another embodiment of the present invention, a data deduplication system comprises a computer system. The computer system stores data in storage domains in a storage system and performs deduplication within each storage domain in the storage domains using a hash table that includes entries for all of the storage domains, wherein cross-deduplication between the storage domains is avoided in the storage system.

According to yet another embodiment of the present invention, a computer program product for deduplicating data comprises a computer-readable-storage media, first program code, and second program code stored on the computer-readable storage media. The first program code is run to store the data in storage domains in a storage system. The second program code is run to perform deduplication within each storage domain in the storage domains using a hash table that includes entries for all of the storage domains, wherein cross-deduplication between the storage domains is avoided in the storage system.

BRIEF DESCRIPTION OF THE DRAWINGS

FIGS. 9-13 illustrate pseudo code for writing new data to storage domains in accordance with an illustrative embodiment.

DETAILED DESCRIPTION

Figure 1:
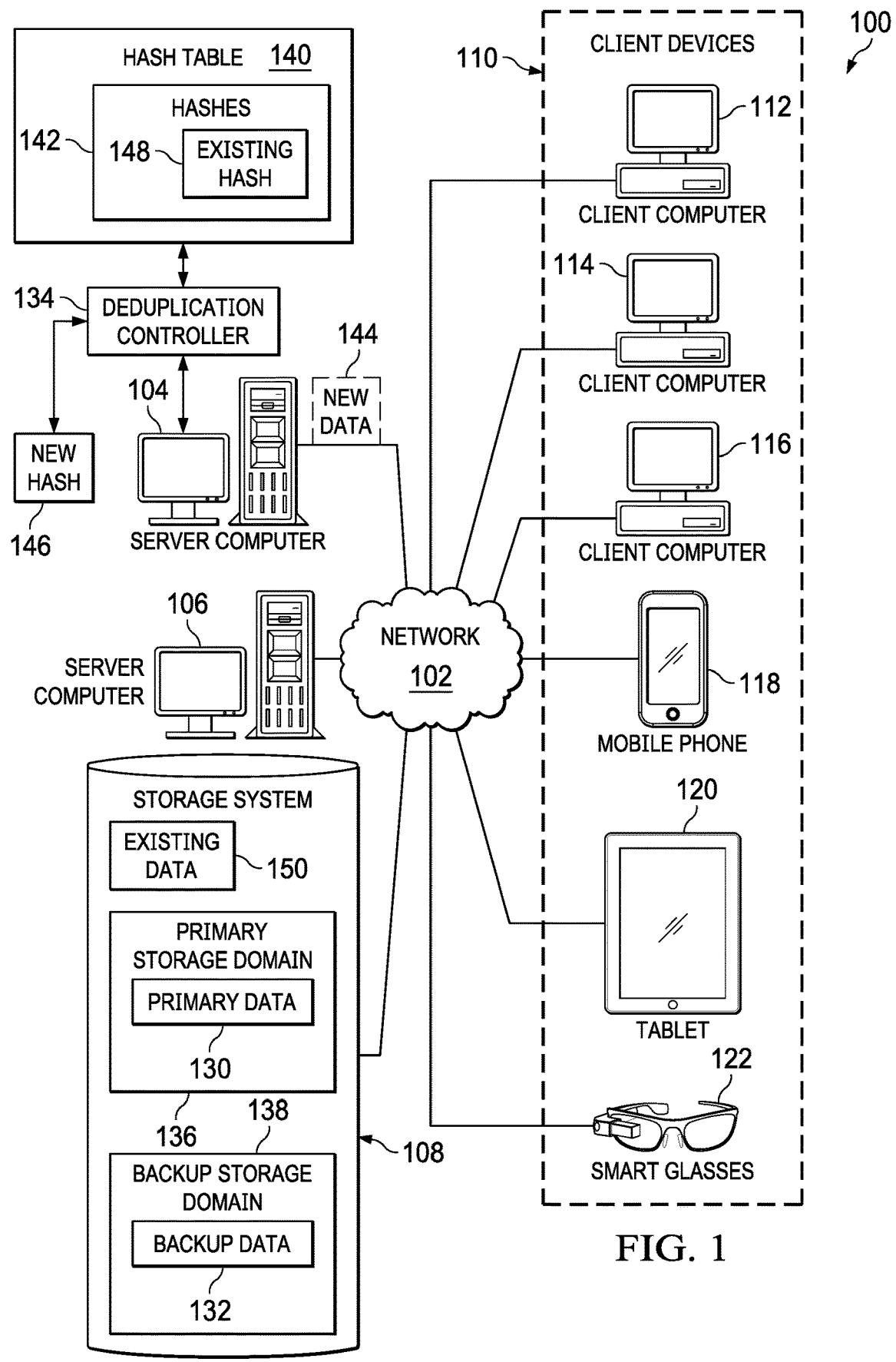
FIG. 1 is a pictorial representation of a network of data processing systems in which illustrative embodiments can be implemented.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may run entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may process the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer program instructions may be provided to a processor of a general-purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which run on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be processed substantially concurrently, or the blocks may sometimes be processed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account one or more different considerations. For example, the illustrative embodiments recognize and take into account that the manner in which some organizations or users store data in storage systems can reduce the feasibility of deduplication. The illustrative embodiments recognize and take into account that organizations or users may place primary data such as production data, development data, and test data on the same storage system as backup data. The illustrative embodiments also recognize and take into account that currently deduplication is a global process for a storage system and when formed on the storage system, only one copy of a piece of data is present. As result, a backup copy of the piece of data is absent. As a result, the illustrative embodiments recognize and take into account that deduplication of the stored system can result in a loss of redundancy in data. For example, deduplication can remove data from a backup of the primary data. As a result, a corruption of the primary data results in an inability to restore the primary data from the backup.

Thus, the illustrative embodiments provide a method, an apparatus, a computer system, and a computer program product for deduplicating data in which actively used data is grouped into one storage domain and the backup of data is grouped into another storage domain. A storage domain is a grouping of data from which deduplication can be performed. For example, one grouping of the data can be servers that store data for used in production, development, testing, or some combination thereof. Another grouping of the data can be servers that are used to backup data.

In one illustrative example, data is stored by a computer system in storage domains in a storage system. Deduplication is performed by the computer system within each storage domain in the storage domains using a hash table that includes entries for all of the storage domains. Cross-deduplication between the storage domains is avoided in the storage system. In other words, a copy of a piece of data stored in one storage domain is not removed because the piece of data is also stored in another storage domain in the storage system.

With reference now to the figures and, in particular, with reference to FIG. 1, a pictorial representation of a network of data processing systems is depicted in which illustrative embodiments can be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage system 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage system 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

In this illustrative example, storage system 108 is connected to network 102. Storage system 108 can be selected from at least one of a network attached storage, a storage area network, Program code located in network data processing system 100 can be stored on a computer-recordable storage medium and downloaded to a data processing system or other device for use. For example, program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, storage system 108 can store data that has multiple types of roles. For example, storage system 108 can store primary data 130 and backup data 132. Primary data 130 can include at least one of production data, development data, or testing data. This data can include at least one of program code, configuration files, data used in day to day tasks, data used to perform tests, spreadsheets, computer aided design files, images, video, audio, or other types of data. Backup data 132 can be copies some or all of primary data 130. Backup data 132 can be used to restore primary data 130 in case of corruption of primary data 130.

As depicted in this example, deduplication controller 134 is configured to control deduplication of primary data 130 and backup data 132 in storage system 108. In this example, primary data 130 and backup data 132 are separated into two storage domains in storage system 108. Primary data 130 is located in primary storage domain 136 and backup data 132 is located in backup storage domain 138.

Hash table 140 contains hashes 142 for data in both primary data 130 in primary storage domain 136 and backup data 132 in backup storage domain 138. In other words, hashes are present in hash table 140 for primary data 130 and backup data 132.

In this illustrative example, deduplication controller 134 performs deduplication of data in primary storage domain 136 and backup storage domain 138 separately. In other words, deduplication is segregated by storage domains in storage system 108. In this illustrative example, the storage domains store the data based on the roles of the data, primary storage domain 136 for primary data 130 which is data that is actively used in tasks and operations performed by a user and backup storage domain 138 for backup data 132 that is maintained for recovery of primary data 130 in case of corruption of primary data 130.

When new data 144 is received for storage in storage system 108, deduplication controller 134 generates new hash 146 and compares new hash 146 to hashes 142 to determine whether existing hash 148 is present in hashes 142 that matches new hash 146. If a match is found, that means that new data 144 is the same as existing data 150 that corresponds to existing hash 148.

When a match is present, deduplication controller 134 determines whether new data 144 is in the same storage domain as existing data 150. For example, if existing data 150 is in primary storage domain 136 and new data 144 is designated for backup storage domain 138, new data 144 is a backup of existing data 150 and is stored in backup storage domain 138. Deduplication controller 134 adds new hash 146 to hash table 140 to reflect that new data 144 is now present in backup storage domain 138.

On the other hand, if new data 144 is designated for storage in primary storage domain 136, new data 144 is a duplicate of existing data 150 and is not stored in primary storage domain 136. In this case, deduplication controller 134 updates hash table 140 to increment a reference count to reflect new data 144 in primary storage domain 136.

As depicted, hash table 140 with hashes 142 for primary data 130 and backup data 132 links the two storage domains, primary storage domain 136 and backup storage domain 138. The use of a single hash table for multiple storage domains reduces the amount of storage resources needed and reduces complexity. Further, hash table 140 with hashes 142 for both primary storage domain 136 and backup storage domain 138 can be used by deduplication controller 134 to perform actions used for at least one of data validation or repair within the storage system 108.

The illustration of deduplication of data in network data processing system 100 is intended as one illustrative example and not meant to limit the manner in which other illustrative examples can be implemented. For example, storage system 108 is shown as attached to network 102. In other illustrative examples, storage system 108 can be a disk drive or solid-state drive in server computer 104. In other illustrative examples, storage system 108 can be storage devices in at least one a group of server computers or group of client devices that are configured as a primary domain and a backup domain.

Figure 2:
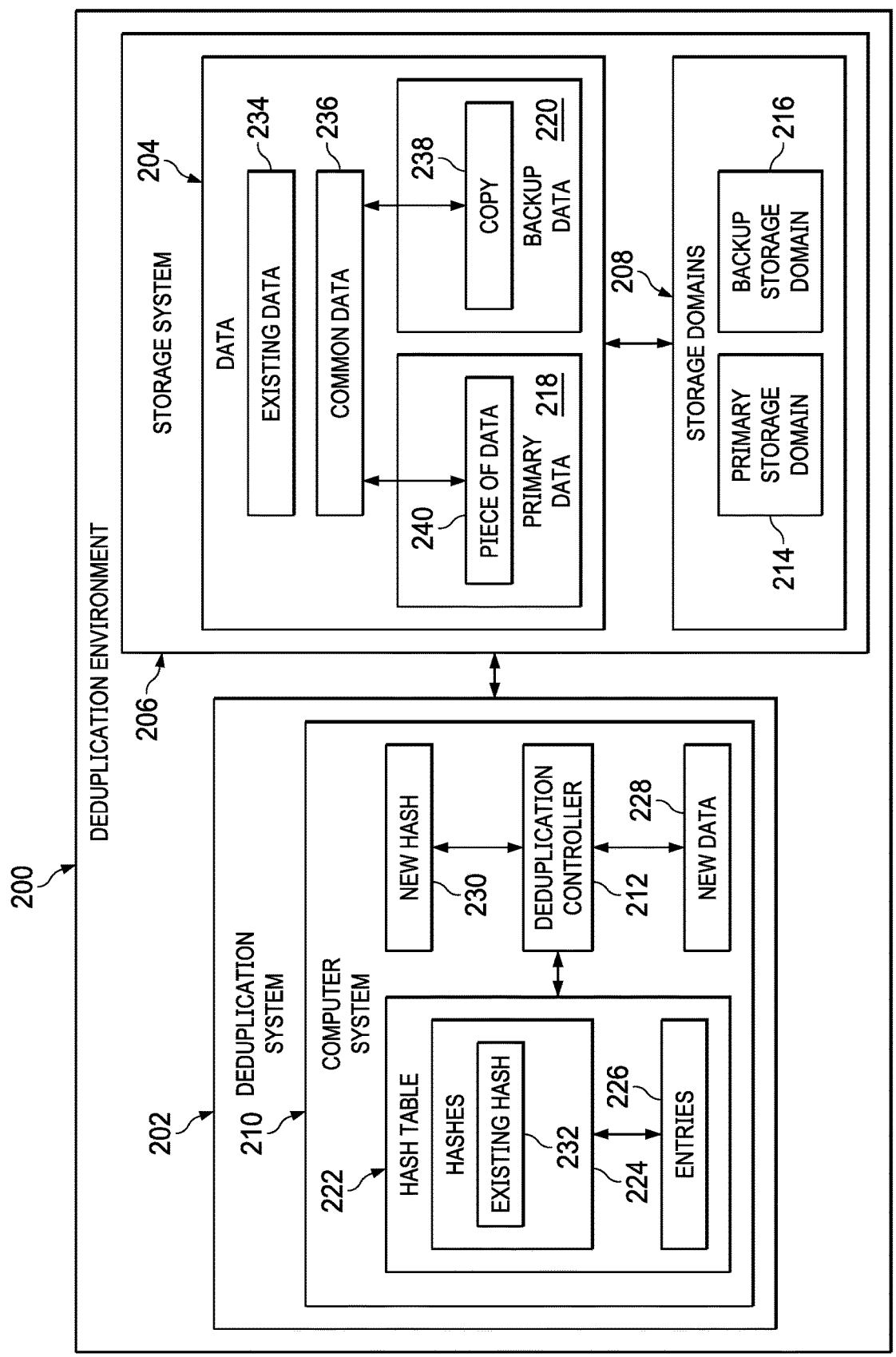
FIG. 2 is a block diagram of a deduplication environment in accordance with an illustrative embodiment.

With reference now to FIG. 2, a block diagram of a deduplication environment is depicted in accordance with an illustrative embodiment. In this illustrative example, deduplication environment 200 includes components that can be implemented in hardware such as the hardware shown in network data processing system 100 in FIG. 1.

As depicted, deduplication system 202 operates in deduplication environment 200 to manage data 204 stored in storage system 206. Storage system 206 is a physical hardware system and can take a number of different forms. For example, storage system 206 can include at least one of a disk drive, a solid state drive, a network attached storage (NAS), a storage area network (SAN), or other types of storage devices.

In this illustrative example, storage system 206 can be divided or partitioned into storage domains 208. The different storage domains can be based on physical hardware or logical constructs. When disk drives are present, computers in which the disk drives are located can be considered part of storage system 206. For example, a set of servers with hard disks can be a storage domain in storage domains 208. As another example, a logical unit number for a logical unit in a storage area network (SAN) can be a storage domain in storage domains 208.

As depicted, deduplication system 202 comprises computer system 210 and deduplication controller 212. As depicted, deduplication controller 212 is located in computer system 210. Computer system 210 is a physical hardware system and includes one or more data processing systems. When more than one data processing system is present in computer system 210, those data processing systems are in communication with each other using a communications medium. The communications medium can be a network. The data processing systems can be selected from at least one of a computer, a server computer, a tablet computer, or some other suitable data processing system.

In this illustrative example, deduplication controller 212 can control the creation of storage domains 208 in storage system 206. A storage domain is a grouping of data 204 for deduplication. For example, deduplication controller 212 can form to storage domains, such as primary storage domain 214 and backup storage domain 216.

Primary storage domain 214 can be used to store primary data 218 in data 204. In this illustrative example, primary data 218 is active data that is used for at least one of production, development, testing, or other purposes. For example, primary storage domain 214 can be at least one of a production storage domain, a development storage domain, a test storage domain, or some other suitable type of storage domain. Backup storage domain 216 stores backup data 220 in data 204. Backup data 220 is used to restore primary data 218 that may be corrupted, accidentally deleted, or otherwise unusable or unavailable.

As depicted, deduplication controller 212 performs deduplication on each storage domain in storage domains 208 separately from other storage domains in storage domains 208. In other words, deduplication is not performed across two or more storage domains.

In this illustrative example, deduplication is performed using hash table 222, which contains hashes 224 for storage domains 208. As depicted, hashes 224 are stored in entries 226 in hash table 222. As depicted, hash table 222 links the different storage domains in storage domains 208.

During operation, deduplication controller 212 in computer system 210 stores data 204 in storage domains 208 in storage system 206. Deduplication controller 212 performs deduplication within each storage domain in storage domains 208 using hash table 222 that includes entries 226 for all of storage domains 208.

As a result, the deduplication performed by deduplication controller 212 in deduplication system 202 avoids cross-deduplication between storage domains 208 in storage system 206. In other words, duplicate copies of data 204 between different storage domains are not removed and replaced with a pointer or reference to removed data.

Thus, the different roles played by different storage domains in storage domains 208 can remain unaffected when an actual copy of data in a particular storage domain is needed. For example, copy 238 of piece of data 240 in backup data 220 in backup storage domain 216 and piece of data 240 in primary data 218 in primary storage domain 214 are not affected by deduplication performed individually on storage domains 208. Both copy 238 of piece of data 240 and piece of data 240 remain in storage domains 208.

Consequently, the role of copy 238 of piece of data 240 in backup storage domain 216 can be fulfilled if piece of 240 in primary storage domain 214 becomes corrupted, missing, or otherwise unusable. In that situation, piece of data 240 in primary storage domain 214 can be recovered using copy 238 of piece of data 240 in backup storage domain 216.

When new data 228 is received for storage, deduplication controller 212 determines whether a match is present between new hash 230 for new data 228 received for storage and existing hash 232 for existing data 234 in hashes 224 in hash table 222. Responsive to the match being present, deduplication controller 212 determines whether the match is for a same storage domain in storage domains 208 as new data 228. In other words, deduplication controller 212 identifies the storage domain in storage domains 208 for existing data 234 and determines whether new data 228 is designated for the same storage domain. The identification of the storage domain for new data 228 can be determined based on a request received to store new data 228. The source originating the request or metadata in the request can be used to identify the storage domain.

Responsive to the match being present for a different storage domain in storage domains 208, deduplication controller 212 stores new data 228 in a particular storage domain in storage domains 208 designated for new data 228.

Further, responsive to the match being for the different storage domain in storage domains 208, deduplication controller 212 updates hash table 222 to reflect that new data 228 exists the particular storage domain in storage domains 208 in addition to existing data 234 in another storage domain in storage domains 208 in storage system 206.

Responsive to the match being for the same storage domain, deduplication controller 212 updates hash table 222 to increment a reference count to reflect new data 228 being present in the another storage domain in the storage domains 208. In this instance, new data 228 is copy 238 of existing data 234 with both being in the same storage domain. As result, only one copy is saved in the storage domain as part of the deduplication process performed by deduplication controller 212.

In this illustrative example, the identification of common data 236 between storage domains 208 can be performed using hash table 222. As depicted, common data 236 can be used to perform at least one of data validation, repair of data, or other actions in primary storage domain 214 in the storage system 206.

For example, common data 236 can be located in both primary storage domain 214 and backup storage domain 216. In this example, common data 236 can be used to replace at least one of corrupted or deleted data in data 204 in primary storage domain 214.

For example, when corruption is present, deduplication controller 212 determines whether copy 238 of piece of data 240 in primary storage domain 214 is present in backup storage domain 216 in response to piece of data 240 in primary storage domain 214 being corrupt. In this illustrative example, copy 238 of piece of data 240 and piece of data 240 are examples of common data 236. Deduplication controller 212 replaces piece of data 240 in primary storage domain 214 with copy 238 of piece of data 240 in response to copy 238 of piece of data 240 being present in backup storage domain 216.

In replacing piece of data 240, deduplication controller 212 determines whether copy 238 of piece of data 240 in backup storage domain 216 is corrupt in response to copy 238 of piece of data 240 being present in backup storage domain 216. Further, deduplication controller 212 replaces piece of data 240 in primary storage domain 214 with copy 238 of piece of data 240 in response to copy 238 of piece of data 240 not being corrupt.

Deduplication controller 212 can be implemented in software, hardware, firmware or a combination thereof. When software is used, the operations performed by deduplication controller 212 can be implemented in program code configured to run on hardware, such as a processor unit. When firmware is used, the operations performed by deduplication controller 212 can be implemented in program code and data and stored in persistent memory to run on a processor unit. When hardware is employed, the hardware may include circuits that operate to perform the operations in deduplication controller 212.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Figure 3:
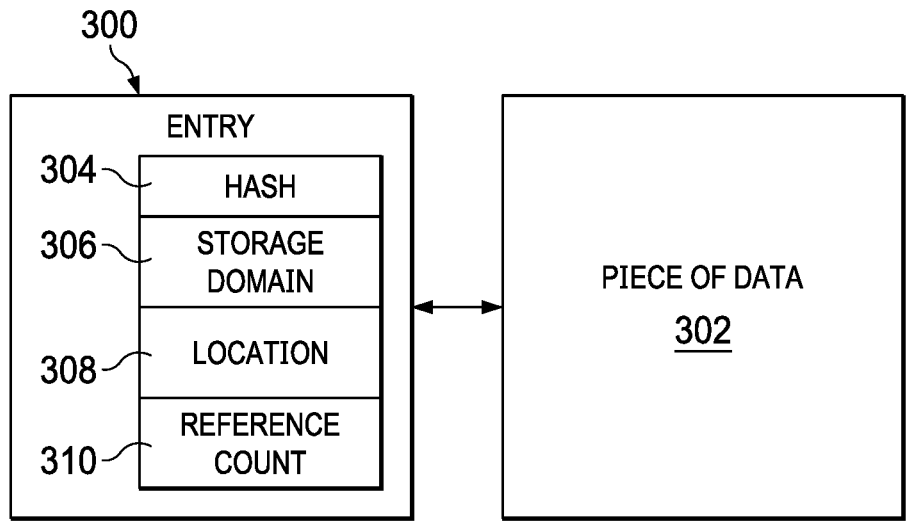
FIG. 3 is a block diagram of an entry in accordance with an illustrative embodiment.

With reference next to FIG. 3, a block diagram of an entry is depicted in accordance with an illustrative embodiment. Entry 300 is an example of one implementation for an entry in entries 226 in hash table 222 in FIG. 2. Entry 300 is used to represent piece of data 302 in a storage system. Piece of data 302 is an example of piece of data 240 in FIG. 2 or other data in data 204 in FIG. 2.

As depicted, entry 300 includes hash 304, storage domain 306, location 308, and reference count 310. In this illustrative example, entry 300 is present for each piece of data in storage domain. If same piece of data is present in two different storage domains, two entries are used to represent those two pieces of data.

Hash 304 is a value generated from piece of data 302. Hash 304 can be generated using any function that can map data of arbitrary size to data of a fixed size.

Storage domain 306 identifies the storage domain in which piece of data 302 is located. Location 308 identifies where piece of data 302 can be found in storage domain 306. For example, location 308 can be a pointer, a logical unit number (LUN), a volume identifier and Internet protocol address, or some other suitable type of location information. Reference count 310 identifies how many copies of piece of data 302 are present in storage domain 306.

In one illustrative example, one or more technical solutions are present that overcome a technical problem with global deduplication being performed in a storage system. As a result, one or more technical solutions can provide a technical effect dividing a storage system into storage domains in which each storage domain deduplicated separately from other storage domains. Further, one or more technical solutions include a hash table that contains information for all of the data in the different storage domains. This common hash table enables reducing the amount of storage and processing resources used to perform deduplication and manage the storage domains in the storage system.

Computer system 210 can be configured to perform at least one of the steps, operations, or actions described in the different illustrative examples using software, hardware, firmware or a combination thereof. As a result, computer system 210 operates as a special purpose computer system in which deduplication controller 212 in computer system 210 enables deduplicating of data 204 across storage domains 208 such that deduplications performed within storage domains 208 and not across storage domains 208 in storage system 206 in a manner that maintains the role of data 204 in particular storage domains. In particular, deduplication controller 212 transforms computer system 210 into a special purpose computer system as compared to currently available general computer systems that do not have deduplication controller 212.

The illustration of deduplication environment 200 and the different components in deduplication environment 200 in FIG. 2 and FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
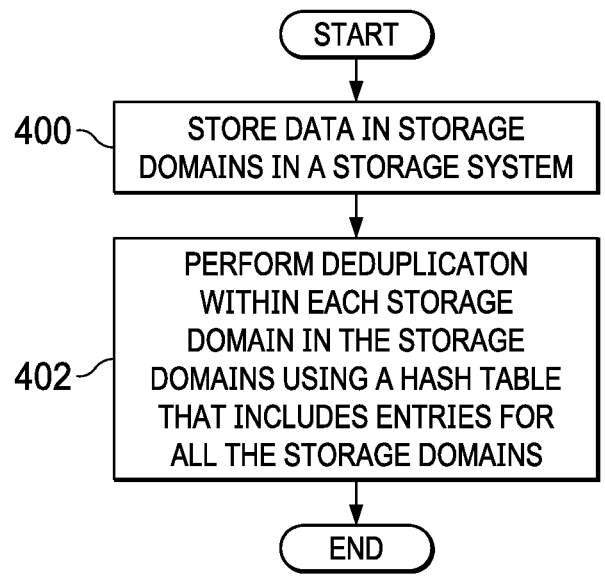
FIG. 4 is a flowchart of a process for deduplicating data in accordance with an illustrative embodiment.

Turning next to FIG. 4, a flowchart of a process for deduplicating data is depicted in accordance with an illustrative embodiment. The process in FIG. 4 can be implemented in hardware, software, or both. When implemented in software, the process can take the form of program code that is run by one of more processor units located in one or more hardware devices in one or more computer systems. For example, the process can be implemented in deduplication controller 212 in computer system 210 in FIG. 2.

The process begins by storing data in storage domains in a storage system (step 400). The process performs deduplication within each storage domain in the storage domains using a hash table that includes entries for all the storage domains (step 402). The process terminates thereafter.

With the process in FIG. 4, cross-deduplication between the storage domains is avoided in the storage system. In other words, copies of the same piece of data in different storage domains are not compressed through the deduplication process. The deduplication process results in a copy of the data being the present in each storage domain in the storage domains in which the copy of the data is stored within the storage system. In this manner, the function of a particular piece of data in a particular storage domain can be maintained with the presence of particular piece of data in the particular storage domain.

Figure 5:
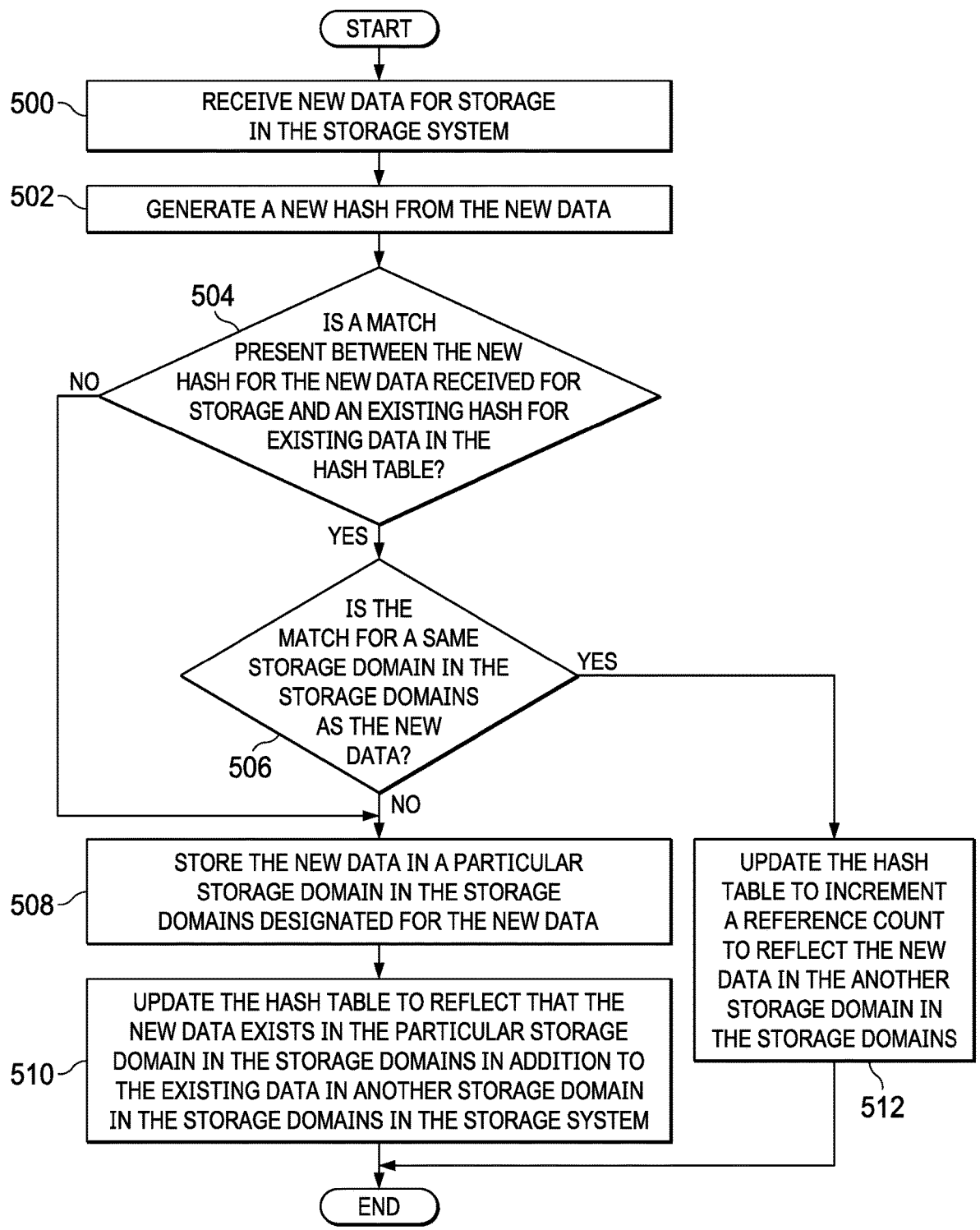
FIG. 5 is a flowchart of a process for storing new data in storage domains in accordance with an illustrative embodiment.

Turning to FIG. 5, a flowchart of a process for storing new data in storage domains is depicted in accordance with an illustrative embodiment. The process in FIG. 5 can be implemented in hardware, software, or both. When implemented in software, the process can take the form of program code that is run by one of more processor units located in one or more hardware devices in one or more computer systems. For example, the process can be implemented in deduplication controller 212 in computer system 210 in FIG. 2.

The process begins by receiving new data for storage in the storage system (step 500). The process generates a new hash from the new data (step 502).

The process determines whether a match is present between the new hash for the new data received for storage and an existing hash for existing data in the hash table (step 504). Responsive to the match being present, the process determines, whether the match is for a same storage domain in the storage domains as the new data (step 506). The storage domain designated for the new data can be determined from the request to store the new data. For example, the request can specify a particular storage domain. In another example, the source of the new data can be used to determine what particular storage domain is used to store the new data.

Responsive to the match being present for a different storage domain in the storage domains, the process stores the new data in a particular storage domain in the storage domains designated for the new data (step 508). The process updates the hash table to reflect that the new data exists in the particular storage domain in the storage domains in addition to the existing data in another storage domain in the storage domains in the storage system (step 510). The process terminates thereafter.

With reference again to step 506, responsive to the match being for the same storage domain, the process updates the hash table to increment a reference count to reflect the new data in the another storage domain in the storage domains (step 512). The process terminates thereafter. In this case, the new data is a duplicate of existing data in the same storage domain and is not stored.

With reference again to step 504, if a match is not present between the new hash for new data received for storage and the existing hash for existing data in the hash table, the process proceeds to step 508 as described above.

Figure 6:
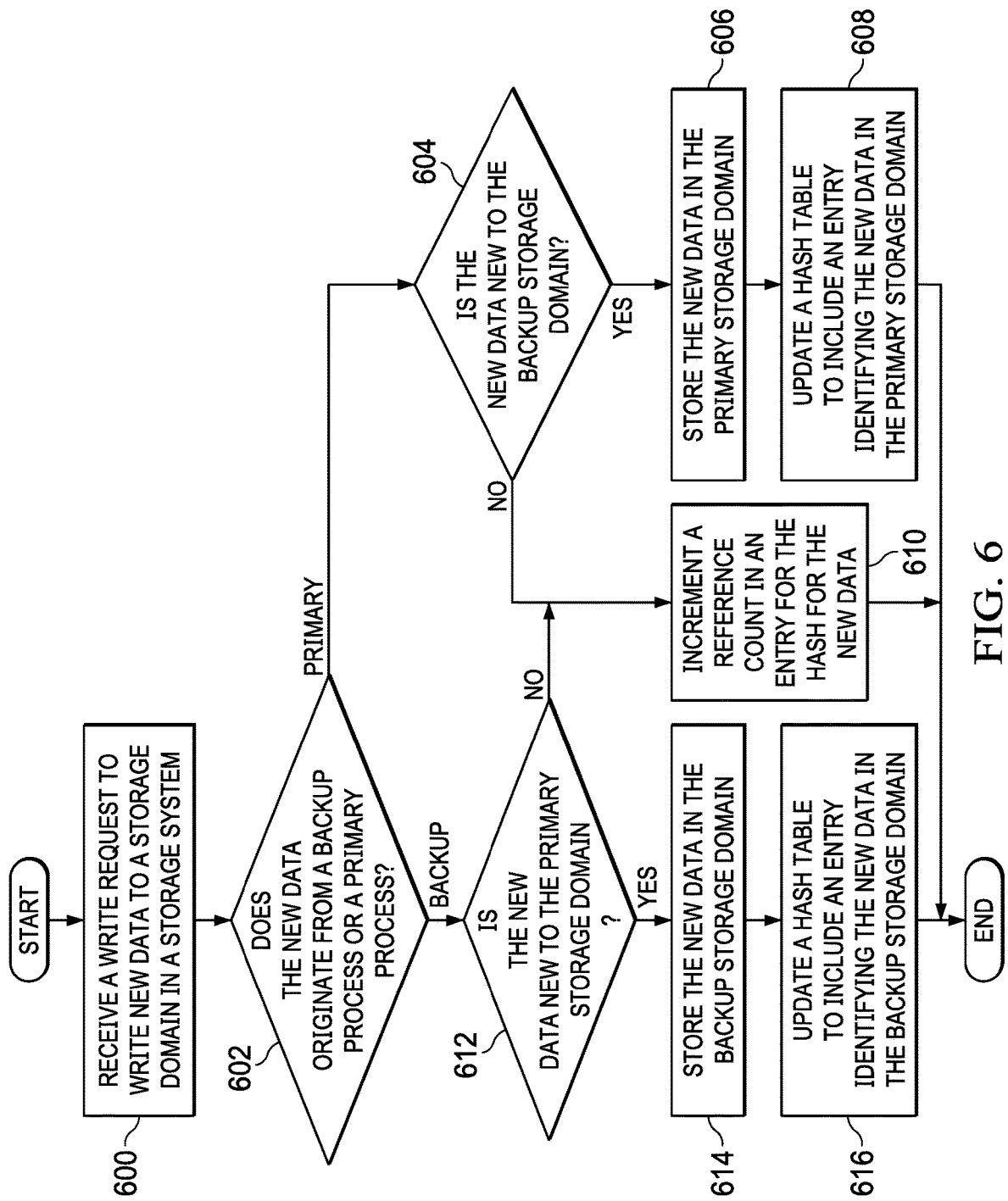
FIG. 6 is another flowchart of a process for storing new data in a storage domain in accordance with an illustrative embodiment.

With reference now to FIG. 6, another flowchart of a process for storing new data in a storage domain is depicted in accordance with an illustrative embodiment. When implemented in software, the process can take the form of program code that is run by one of more processor units located in one or more hardware devices in one or more computer systems. For example, the process can be implemented in deduplication controller 212 in computer system 210 in FIG. 2. This example describes receiving data from storage from a production process for a backup process.

The process begins by receiving a write request to write new data to a storage domain in a storage system (step 600). A determination is made as to whether the new data originates from a backup process or a primary process (step 602). For example, the data may be for a request to write data for a primary process such as a production process, a development process, or a testing process. As another example, the data may be for a request to write data for a backup process. This identification can be made from metadata in the write request. For example, a tag may be included in the metadata with the new data to indicate at least one of the source of the new data or the storage domain designated to store new data.

If the data is received from a primary process, a determination is made as to whether the new data is new to the primary storage domain (step 604). The determination in step 602 can be made by creating a hash from the new data and comparing the hash to existing hashes for the primary storage domain.

If the data is new to the primary domain, the process stores the new data in the primary storage domain (step 606). The process updates a hash table to include an entry identifying the new data in the primary storage domain (step 608). The process terminates thereafter.

With reference again to step 604, if the new data is not new to the primary storage domain, the process increments a reference count in an entry for the hash for the new data (step 610).

With reference again to step 602, if the data is received from a backup process, a determination is made as to whether the new data is new to the backup storage domain (step 612). If the new data is new to the back of storage domain, the process stores the new data in the backup storage domain (step 614). The process updates a hash table to include an entry identifying the new data in the backup storage domain (step 616). The process terminates thereafter. With reference again to step 612, if the new data is not new to the backup storage domain, the process proceeds to step 610.

Figure 7:
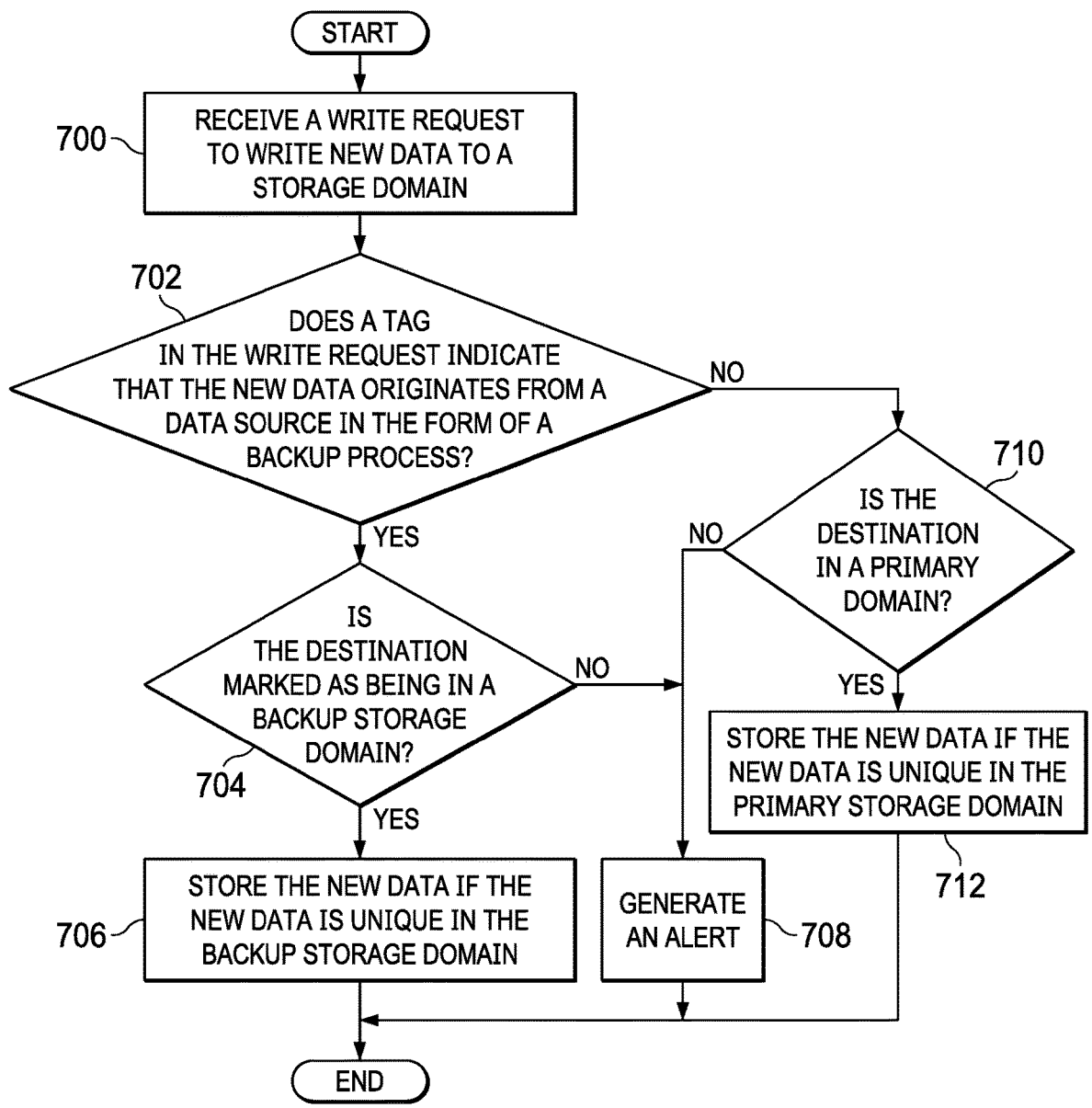
FIG. 7 is a flowchart of a process for storing data using tags in accordance with an illustrative embodiment.

Turning to FIG. 7, a flowchart of a process for storing data using tags is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in deduplication controller 212 in computer system 210 in FIG. 2. This process can be used to identify a storage domain for new data received for storage in a storage system with multiple storage domains. For example, tags can be used in write requests to identify the source originating the data for storage.

The process beings by receiving a write request to write new data to a storage domain (step 700). A determination is made as to whether a tag in the write request indicates that the new data originates from a data source in the form of a backup process (step 702). In this illustrative example, the metadata in the write request can include a tag that identifies the source of the new data. Further, the metadata includes a destination for the new data. This destination can be, for example, a volume or logical unit number is this illustrative example.

If the tag indicates that the new data originates from a backup process, a determination is made as to whether the destination is marked as being in a backup storage domain (step 704). If the destination is marked as being in a backup storage domain, the process stores the new data if the new data is unique in the backup storage domain (step 706). The process terminates thereafter.

With reference again to step 704, if the destination is not marked as being in a backup storage domain, the process generates an alert (step 708). The process terminates thereafter. In this case, a mismatch is present between the tag and the destination in the metadata.

Turning back to step 702, if a tag is not present that indicates that the new data originates from a data source in the form of a backup process, the process determines whether the destination is in a primary domain (step 710). If the destination is in the primary domain the process stores the new data if the new data is unique in the primary storage domain (step 712). The process terminates thereafter. Otherwise, the process proceeds to step 708. Step 706 and step 712 can be implemented using steps from the flowchart in FIG. 6.

Figure 8:
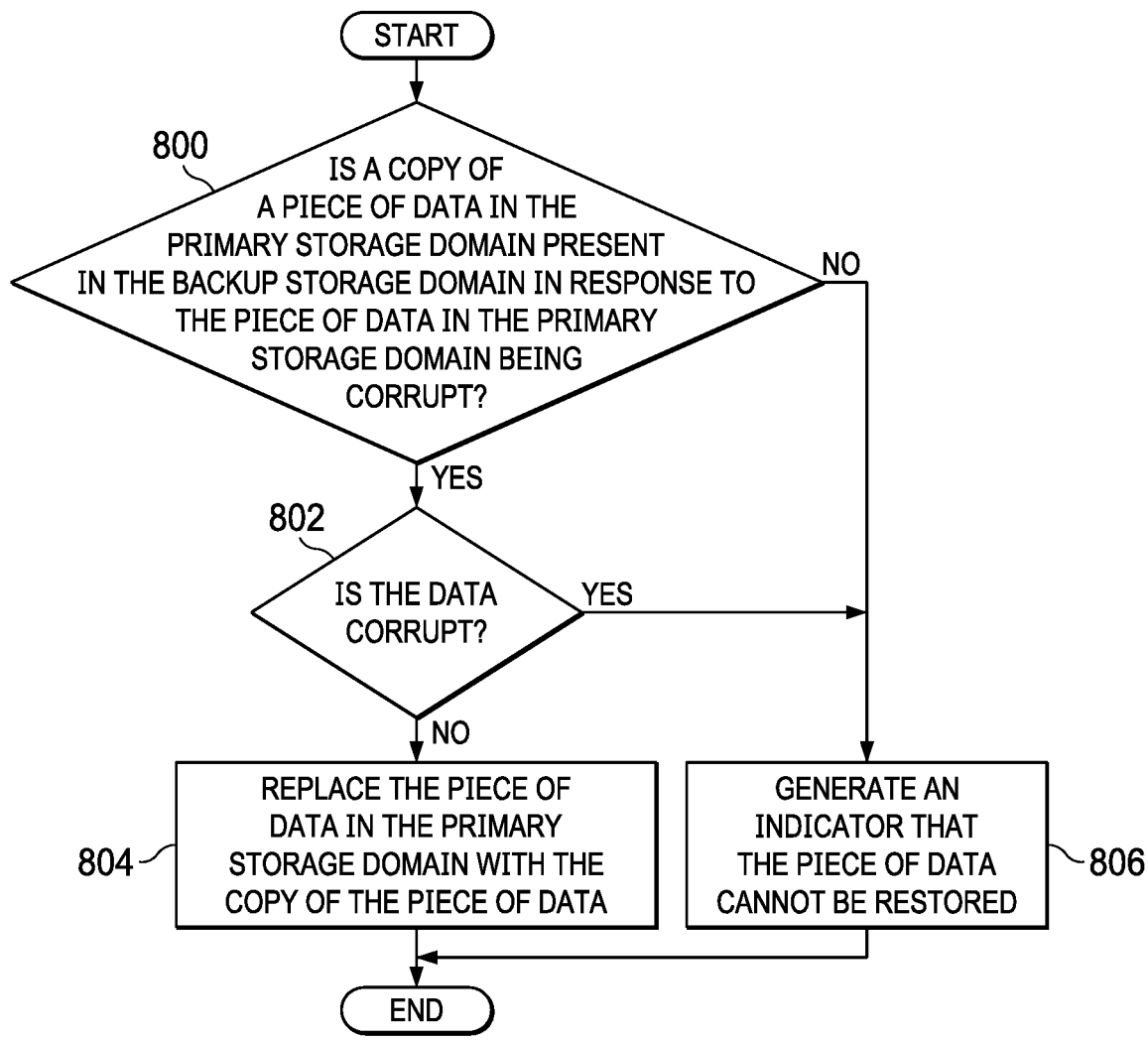
FIG. 8 is a flowchart of a process for restoring data in accordance with an illustrative embodiment.

With reference next to FIG. 8, a flowchart of a process for restoring data is depicted in accordance with an illustrative embodiment. The process in FIG. 8 can be implemented in hardware, software, or both. When implemented in software, the process can take the form of program code that is run by one of more processor units located in one or more hardware devices in one or more computer systems. For example, the process can be implemented in deduplication controller 212 in computer system 210 in FIG. 2.

The process begins by determining whether a copy of a piece of data in the primary storage domain is present in the backup storage domain in response to the piece of data in the primary storage domain being corrupt (step 800). The piece of data can be identified based on a segment identifier in this illustrative example. The segment identifier can be a range of physical locations such as a segment in a disk drive.

If a copy of the piece of data is present in the backup storage domain, the process determines whether the data is corrupt (step 802). If the copy of the piece of data is not corrupt in the backup storage domain, the process replaces the piece of data in the primary storage domain with the copy of the piece of data (step 804). The process terminates thereafter.

The replacement in step 804 is an actual physical replacement of data. In other words, the pointer to the copy of the piece of data is not used in the primary storage domain. Instead, the copy of the piece data is actually placed into the primary storage domain to replace the corrupted piece of data in the primary storage domain.

With reference back to step 802, if the copy of the piece of data in the backup storage domain is corrupt, the process generates an indicator that the piece of data cannot be restored (step 806). The process terminates thereafter. With again to step 800, if the copy of the piece of data is not present in the backup storage domain, the process proceeds to step 806 as described above.

The flowcharts and block diagrams in the different depicted embodiments illustrate the architecture, functionality, and operation of some possible implementations of apparatuses and methods in an illustrative embodiment. In this regard, each block in the flowcharts and or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

With reference to FIGS. 9-13, illustrations of pseudo code for writing new data to storage domains are depicted in accordance with an illustrative embodiment. In this illustrative example, pseudo code 900 can be implemented in deduplication controller 212 in computer system 210 in FIG. 2 for a process that handles an incoming write request to write data to storage domains such as a primary storage domain in the form of a production storage domain and a backup storage domain.

As depicted, section 902 pseudo code 900 defines lists for tracking environmental constructs. In this example, environmental constructs are for control structures in the process.

In this illustrative example, section 904 in pseudo code 900 defines lookup functions for searching constructs. Section 906 defines functions for performing operations on data and tracking constructs.

Section 908 pseudo code 900 processes an incoming write request. Sub-section 910 in section 908 checks the source of the write request and the destination. The source can be, for example, a production host (PROD_HOST) or a backup host (BKP_HOST). The destination is a volume/logical unit number (LUN) in this example. Sub-section 912 in section 908 performs integrity checks and repairs as needed on data in the production domain. Pseudo code 900 in this section writes the data in a manner that avoids cross-deduplication.

Section 914 in pseudo code 900 writes data to the backup domain separately from production. The writing of data in section 914 avoids cross-deduplication and makes the associated metadata updates in the hash table for the storage domains.

Figure 14:
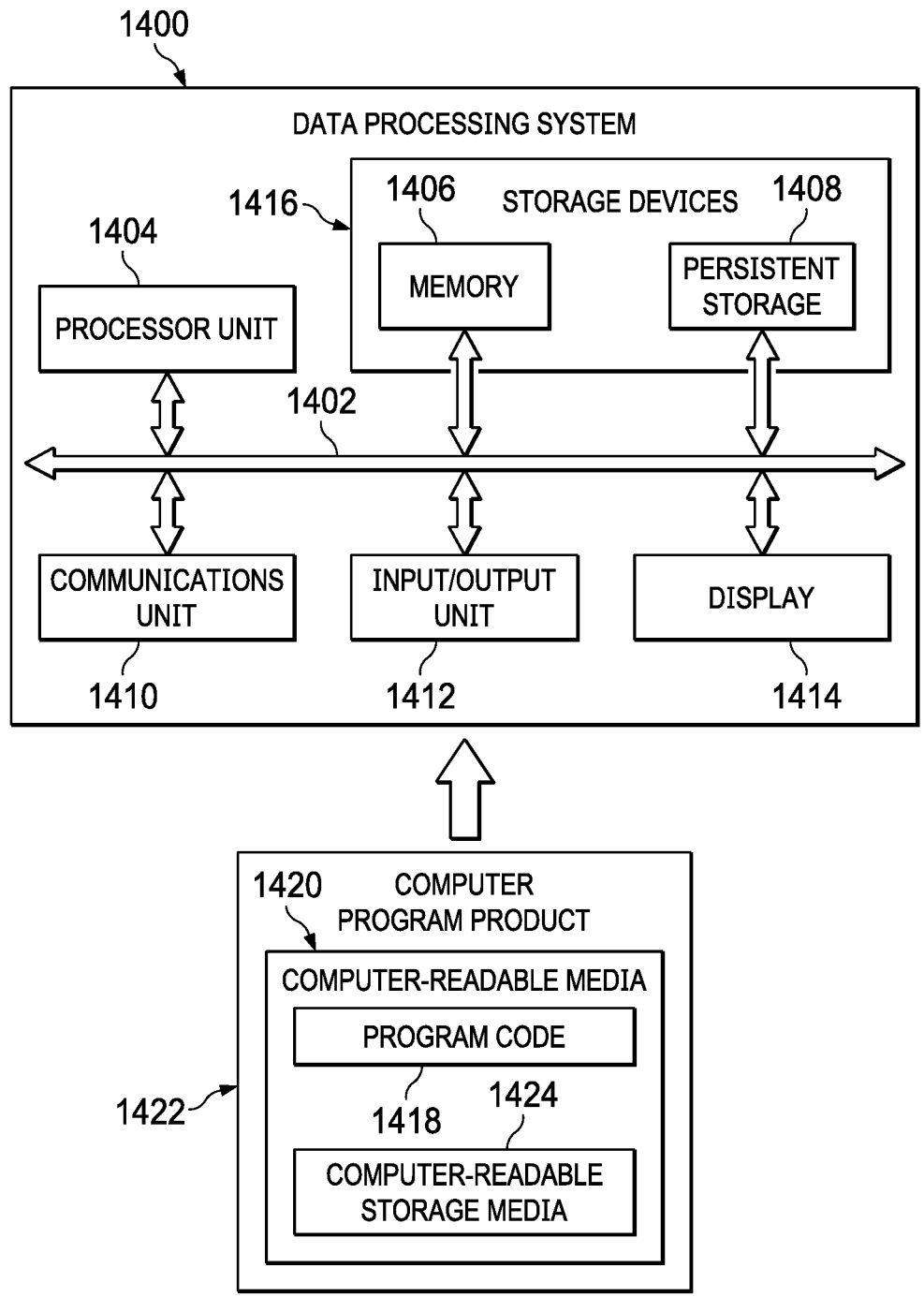
FIG. 14 is a block diagram of a data processing system in accordance with an illustrative embodiment.

Turning now to FIG. 14, a block diagram of a data processing system is depicted in accordance with an illustrative embodiment. Data processing system 1400 can be used to implement server computer 104, server computer 106, client devices 110, in FIG. 1. Data processing system 1400 can also be used to implement computer system 210 in FIG. 2. In this illustrative example, data processing system 1400 includes communications framework 1402, which provides communications between processor unit 1404, memory 1406, persistent storage 1408, communications unit 1410, input/output (I/O) unit 1412, and display 1414. In this example, communications framework 1402 takes the form of a bus system.

Processor unit 1404 serves to process instructions for software that can be loaded into memory 1406. Processor unit 1404 includes one or more processors. For example, processor unit 1404 can be selected from at least one of a multicore processor, a central processing unit (CPU), a graphics processing unit (GPU), a physics processing unit (PPU), a digital signal processor (DSP), a network processor, or some other suitable type of processor.

Memory 1406 and persistent storage 1408 are examples of storage devices 1416. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1416 may also be referred to as computer-readable storage devices in these illustrative examples. Memory 1406, in these examples, can be, for example, a random-access memory or any other suitable volatile or non-volatile storage device. Persistent storage 1408 may take various forms, depending on the particular implementation.

For example, persistent storage 1408 may contain one or more components or devices. For example, persistent storage 1408 can be a hard drive, a solid-state drive (SSD), a flash memory, a rewritable optical disk, a rewritable magnetic tape, or some combination of the above. The media used by persistent storage 1408 also can be removable. For example, a removable hard drive can be used for persistent storage 1408.

Communications unit 1410, in these illustrative examples, provides for communications with other data processing systems or devices. In these illustrative examples, communications unit 1410 is a network interface card.

Input/output unit 1412 allows for input and output of data with other devices that can be connected to data processing system 1400. For example, input/output unit 1412 may provide a connection for user input through at least one of a keyboard, a mouse, or some other suitable input device. Further, input/output unit 1412 may send output to a printer. Display 1414 provides a mechanism to display information to a user.

Instructions for at least one of the operating system, applications, or programs can be located in storage devices 1416, which are in communication with processor unit 1404 through communications framework 1402. The processes of the different embodiments can be performed by processor unit 1404 using computer-implemented instructions, which may be located in a memory, such as memory 1406.

These instructions are referred to as program code, computer usable program code, or computer-readable program code that can be read and processed by a processor in processor unit 1404. The program code in the different embodiments can be embodied on different physical or computer-readable storage media, such as memory 1406 or persistent storage 1408.

Program code 1418 is located in a functional form on computer-readable media 1420 that is selectively removable and can be loaded onto or transferred to data processing system 1400 for processing by processor unit 1404. Program code 1418 and computer-readable media 1420 form computer program product 1422 in these illustrative examples. In the illustrative example, computer-readable media 1420 is computer-readable storage media 1424.

In these illustrative examples, computer-readable storage media 1424 is a physical or tangible storage device used to store program code 1418 rather than a medium that propagates or transmits program code 1418.

Alternatively, program code 1418 can be transferred to data processing system 1400 using a computer-readable signal media. The computer-readable signal media can be, for example, a propagated data signal containing program code 1418. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1400 are not meant to provide architectural limitations to the manner in which different embodiments can be implemented. In some illustrative examples, one or more of the components may be incorporated in or otherwise form a portion of, another component. For example, memory 1406, or portions thereof, may be incorporated in processor unit 1404 in some illustrative examples. The different illustrative embodiments can be implemented in a data processing system including components in addition to or in place of those illustrated for data processing system 1400. Other components shown in FIG. 14 can be varied from the illustrative examples shown. The different embodiments can be implemented using any hardware device or system capable of running program code 1418.

Thus, illustrative embodiments of the present invention provide a computer implemented method, an apparatus, a computer system, and a computer program product for deduplicating data. Data is stored by a computer system in storage domains in a storage system. Deduplication is performed by the computer system within each storage domain in the storage domains using a hash table that includes entries for all of the storage domains. Cross-deduplication between the storage domains is avoided in the storage system.

As a result, one or more illustrative examples are present that overcome a technical problem with global deduplication being performed in a storage system. As a result, one or more illustrative examples can provide a technical effect providing a store system into storage domains in which each storage domain is deduplicated separately from other storage domains. Further, one or more illustrative examples employ a hash table that contains information for all of the data in the different storage domains. This common hash table enables reducing the amount of storage and processing resources used to perform deduplication and enables managing the storage domains in the store system.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for deduplicating data and avoiding cross-domain deduplication in a plurality of storage domains, the method comprising:
   receiving, by a computer system, new data to be stored in a designated storage domain of the plurality of storage domains; and
   determining, by the computer system, whether an entry is present in a single hash table for the new data, wherein the single hash table includes entries for all of the plurality of storage domains;
   responsive to determining no entry is present in the single hash table for the new data:
      storing, by the computer system, the new data in the designated storage domain; and
      adding, by the computer system, an entry in the single hash table indicating the new data is stored in the designated storage domain;
   responsive to determining an entry is present in the single hash table for the new data:
      determining, by the computer system, whether the entry is for data stored in a storage domain in the storage domains other than the designated storage domain; and
      responsive to determining that the entry is for existing data stored on a storage domain in the storage domains other than the designated storage domain:
         storing, by the computer system, the new data in the designated storage domain; and
         updating, by the computer system, the entry to reflect that the new data exists in the designated storage domain in addition to the existing data in another storage domain in the plurality of storage domains.

2. The method of claim 1 further comprising:
   responsive to determining that the entry is for data stored on the same designated storage domain, updating, by the computer system, the hash table to increment a reference count to reflect the new data in the another storage domain in the storage domains.

3. The method of claim 2 wherein the step of updating the hash table comprises incrementing a reference count in the entry.

4. The method of claim 1, wherein a primary storage domain in the plurality of storage domains stores for primary data and a backup storage domain in the plurality of storage domains stores for backup data.

5. The method of claim 4 further comprising:
   identifying, by the computer system, common data located in both the primary storage domain and the backup storage domain, wherein the common data is used to perform at least one of data validation or repair of the data in the primary storage domain.

6. The method of claim 4 further comprising:
   determining, by the computer system, whether a copy of a piece of data in the primary storage domain is present in the backup storage domain in response to the piece of data in the primary storage domain being corrupt; and
   replacing, by the computer system, the piece of data in the primary storage domain with the copy of the piece of data in response to the copy of the piece of data being present in the backup storage domain.

7. The method of claim 6, wherein replacing, by the computer system, the piece of data in the primary storage domain with the copy of the piece of data in response to the copy of the piece of data being present in the backup storage domain comprises:
   determining, by the computer system, whether the copy of the piece of data in the backup storage domain is corrupt in response to the copy of the piece of data being present in the backup storage domain; and
   replacing, by the computer system, the piece of data in the primary storage domain with the copy of the piece of data in response to the copy of the piece of data not being corrupt.

8. A data deduplication system that avoids cross-domain deduplication in a plurality of storage domains, the deduplication system comprising:
   a computer system, wherein the computer system:
   determines whether a match is present between a new hash in a hash table for new data received for storage and an existing hash for existing data in the hash table, wherein the hash table includes entries for all of the plurality of storage domains;
   responsive to the matching being present, determines whether the match is for a same storage domain in the plurality of storage domains;
   responsive to the match being for a different storage domain in the plurality of storage domains, stores the new data in a particular storage domain in the storage domains designated for the new data; and
   responsive to the match being for the different storage domain in the plurality of storage domains, updating the hash table to reflect that the new data exists in the particular storage domain in the plurality of storage domains in addition to the existing data in another storage domain in the plurality of storage domains.

9. The data deduplication system of claim 8, wherein the computer system, responsive to the match being for the same storage domain, updates the hash table to increment a reference count to reflect the new data in the another storage domain in the plurality of storage domains.

10. The deduplication system of claim 9 wherein the computer system updates the hash table by incrementing a reference count in the existing hash in the hash table.

11. The data deduplication system of claim 8, wherein a primary storage domain in the plurality of storage domains stores for primary data and a backup storage domain in the plurality of storage domains stores for backup data.

12. The data deduplication system of claim 11, wherein the computer system identifies common data located in both the primary storage domain and the backup storage domain, wherein the common data is used to at least one of data validation or repair of the data in the primary storage domain.

13. The data deduplication system of claim 11 further comprising:
   determining whether a copy of a piece of data in the primary storage domain is present in the backup storage domain in response to the piece of data in the primary storage domain being corrupt; and
   replacing the piece of data in the primary storage domain with the copy of the piece of data in response to the copy of the piece of data being present in the backup storage domain.

14. The data deduplication system of claim 13, wherein replacing the piece of data in the primary storage domain with the copy of the piece of data in response to copy of the piece of data being present in the backup storage domain comprises:

determining whether the copy of the piece of data in the backup storage domain is corrupt in response to the copy of the piece of data being present in the backup storage domain; and replacing the piece of data in the primary storage domain with the copy of the piece of data in response to the copy of the piece of data not being corrupt.

15. A computer program product for deduplicating data and avoiding cross-domain deduplication in a plurality of storage domains, the computer program product comprising:

a computer-readable storage media;

program code, stored on the computer-readable storage media, for determining whether a match is present between a new hash for new data received for storage and an existing hash in a hash table for existing data, wherein the hash table includes entries of all storage domains of the plurality of storage domains, wherein the data is received for storage on a designated storage domain of the plurality of storage domains;

program code, stored on the computer-readable storage media, responsive to the matching being present, for determining whether the match for the existing data is for data stored in a same storage domain in the plurality of storage domains as the new data to be stored in the designated storage domain;

program code, stored on the computer-readable storage media, responsive to the match being for a different storage domain in the plurality of storage domains, for storing the new data in the designated storage domain in the plurality of storage domains; and program code, stored on the computer-readable storage media, responsive to the match being for the different storage domain in the plurality of storage domains, for updating the hash table to reflect that the new data exists in the designated storage domain in the plurality of storage domains in addition to the existing data in another storage domain in the plurality of storage domains.

16. The computer program product of claim 15 further comprising:

program code, stored on the computer-readable storage media, responsive to the match being for the same storage domain, for updating the hash table to increment a reference count to reflect the new data in the another storage domain in the plurality of storage domains.

17. The computer program product of claim 16 wherein program code for updating the hash table further comprises program code for updating the hash table by incrementing a reference count in the existing has in the hash table.

18. The computer program product of claim 15, wherein a primary storage domain in the plurality of storage domains stores for primary data and a backup storage domain in the plurality of storage domains stores for backup data and further comprising:

program code, stored on the computer-readable storage media, for identifying common data located in both the primary storage domain and the backup storage domain, wherein the common data is used to at least one of data validation or repair of the data in the primary storage domain.

19. The computer program product of claim 15, wherein a primary storage domain in the plurality of storage domains stores for primary data and a backup storage domain in the plurality of storage domains stores for backup data and further comprising:

program code, stored on the computer-readable storage media, for determining whether a copy of a piece of data in the primary storage domain is present in the backup storage domain in response to the piece of data in the primary storage domain being corrupt; and program code, stored on the computer-readable storage media, for replacing the piece of data in the primary storage domain with the copy of the piece of data in response to the copy of the piece of data being present in the backup storage domain.

20. The computer program product of claim 19, wherein program code for replacing the piece of data further comprises:

program code, stored on the computer-readable storage media, for determining whether the copy of the piece of data in the backup storage domain is corrupt in response to the copy of the piece of data being present in the backup storage domain; and program code, stored on the computer-readable storage media, for replacing the piece of data in the primary storage domain with the copy of the piece of data in response to the copy of the piece of data not being corrupt.

* * * * *